C. W. WOODSON.
HARVESTER.
APPLICATION FILED OCT. 7, 1918. RENEWED JULY 19, 1921.
1,405,885.  Patented Feb. 7, 1922.
3 SHEETS—SHEET 2.
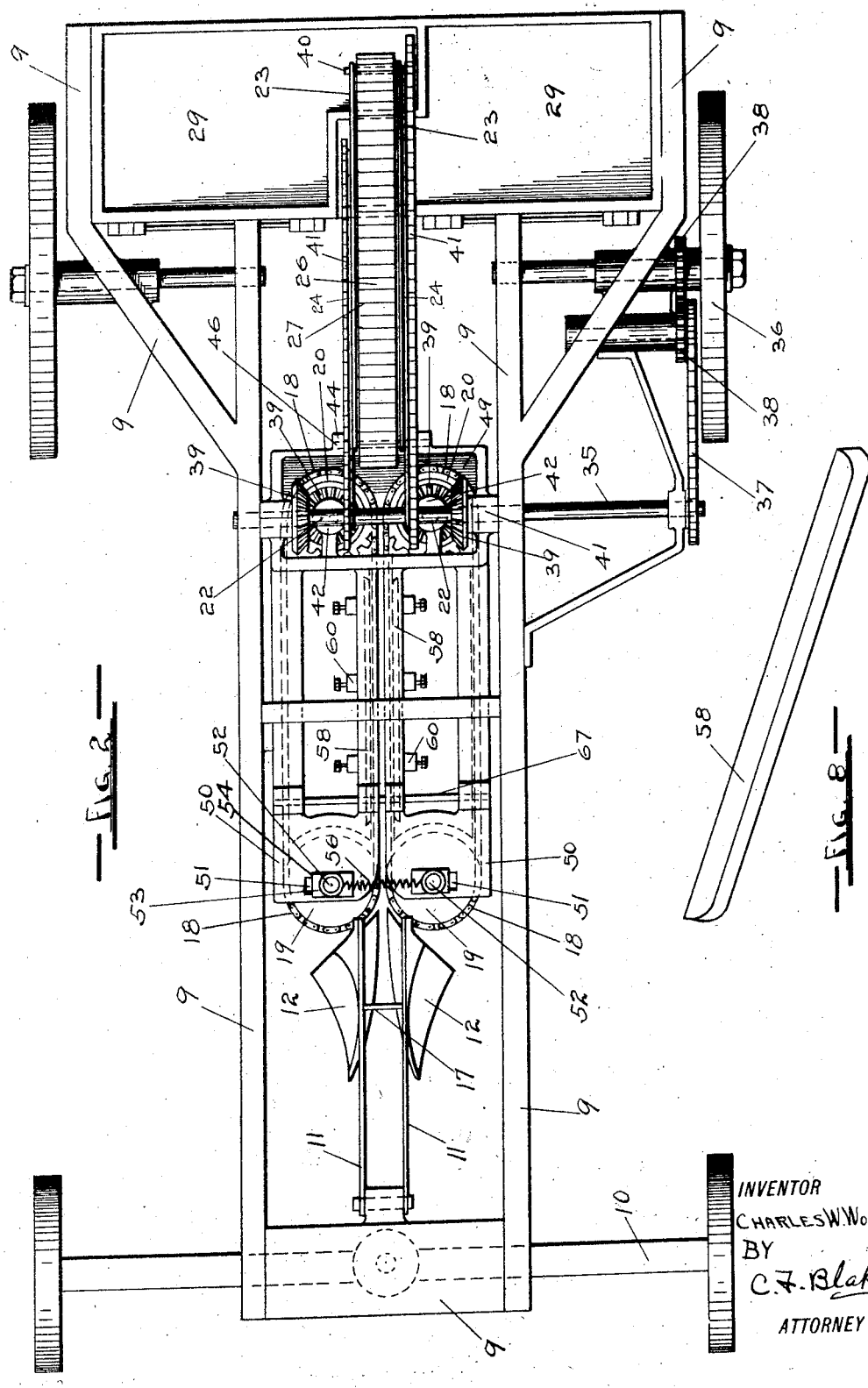
INVENTOR
CHARLES W. WOODSON
BY
C. F. Blake
ATTORNEY

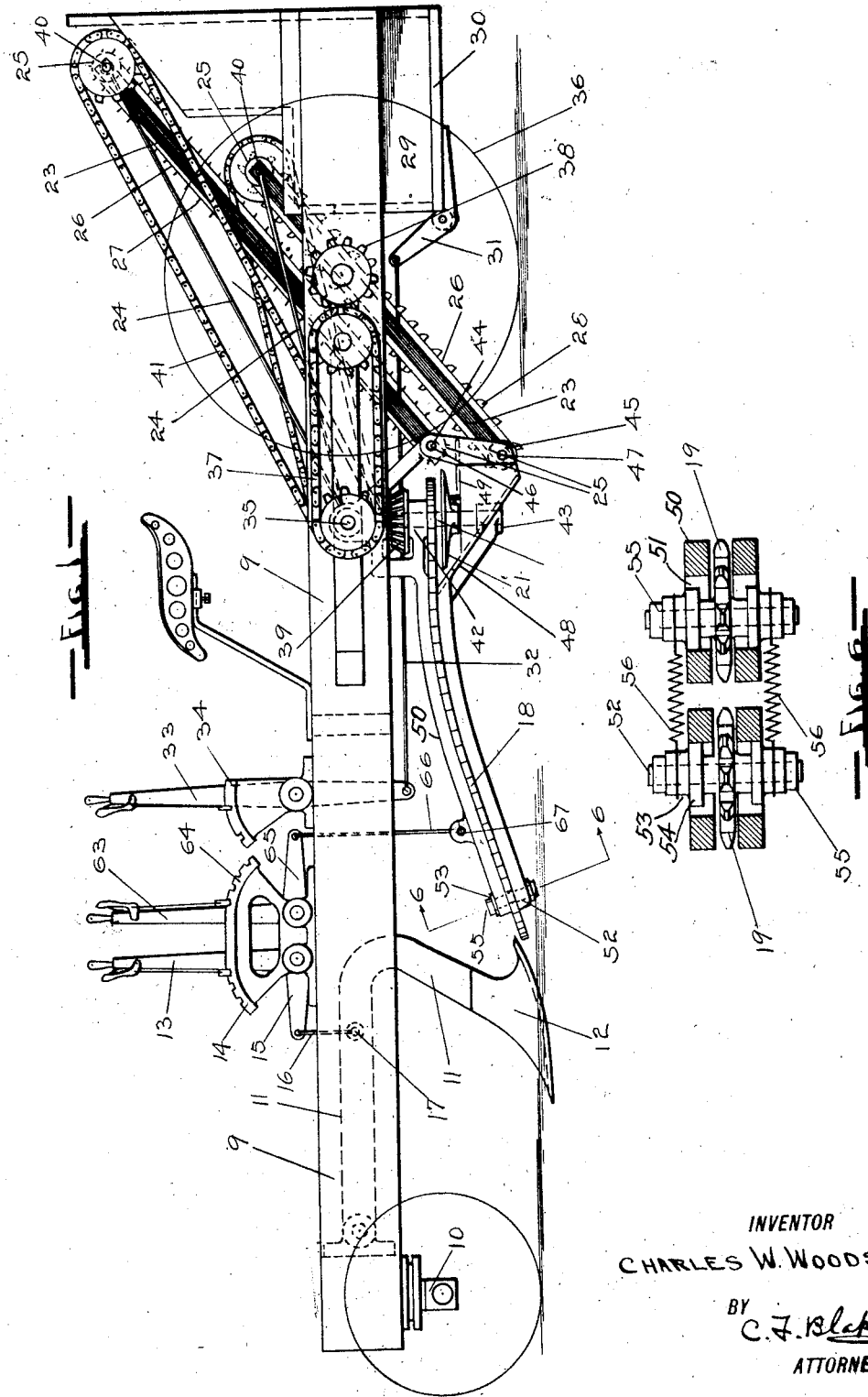

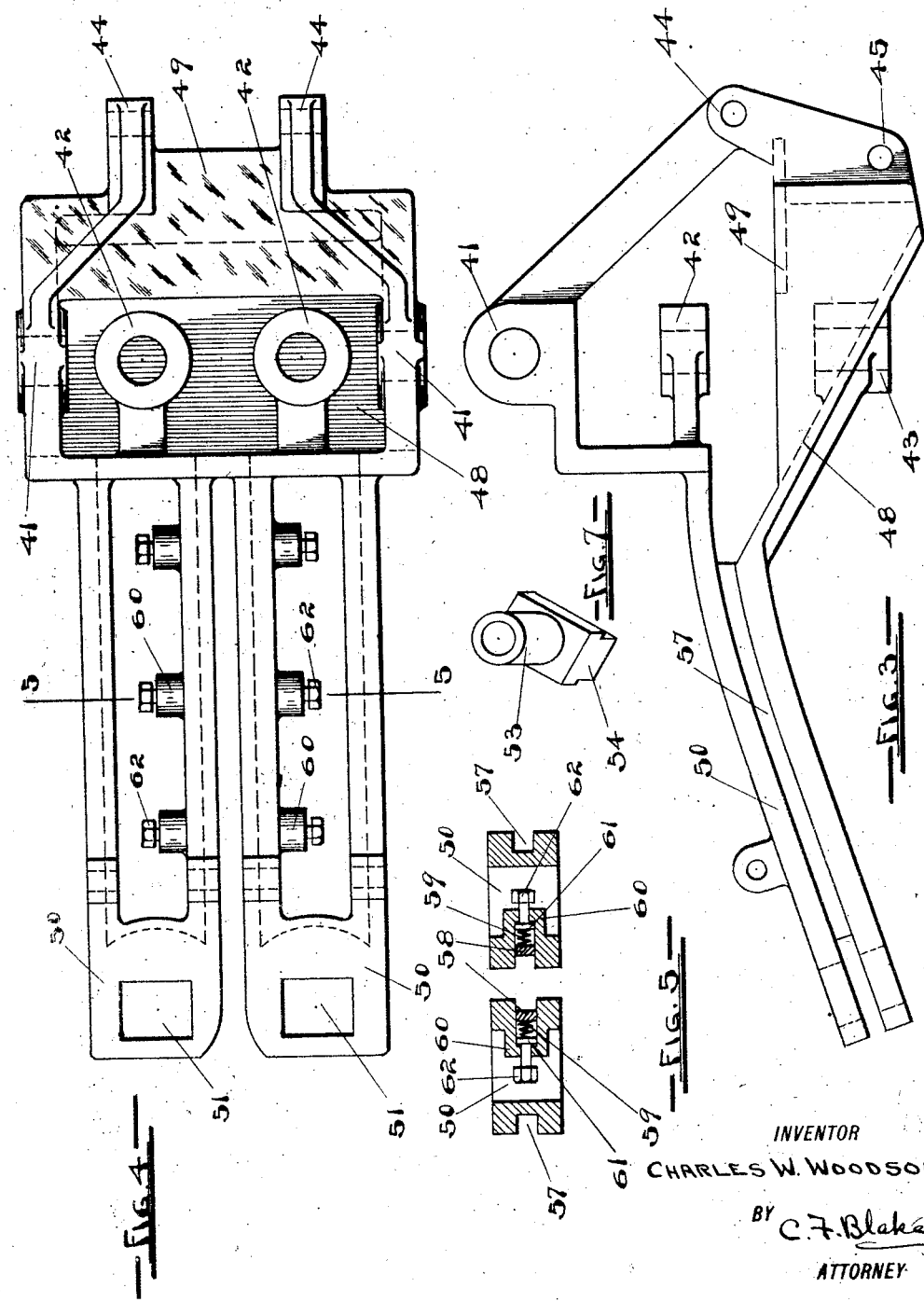

UNITED STATES PATENT OFFICE.

CHARLES W. WOODSON, OF PORTLAND, OREGON.

HARVESTER.

1,405,885.   Specification of Letters Patent.   Patented Feb. 7, 1922.

Application filed October 7, 1918, Serial No. 257,285. Renewed July 19, 1921. Serial No. 485,844.

*To all whom it may concern:*

Be it known that I, CHARLES W. WOODSON, a citizen of the United States, and a resident of Portland, county of Multnomah, State of Oregon, have invented certain new and useful Improvements in Harvesters, of which the following is a specification.

My invention relates to harvesters in general, and particularly to such harvesters as are adapted to the harvesting of beets and the like.

The object of my invention is to produce a device that will plow the beets from the ground, remove the tops thereof, and deposit the tops and the beets in separate receptacles.

I accomplish the above object by means of the construction illustrated in the accompanying drawings, which are a part of this application for Letters Patent, like characters of reference indicating like parts throughout the several views thereof, and in which;

Fig. 1 is a side elevation of my device.

Fig. 2 is a plan view of my device, the seat and operating levers being removed therefrom.

Fig. 3 is a side elevation of the oscillating frame, upon an enlarged scale.

Fig. 4 is a plan view of the subject matter of Fig. 3.

Fig. 5 is a sectional view upon line 5—5 of Fig. 4.

Fig. 6 is a sectional view upon line 6—6 of Fig. 1.

Fig. 7 is a perspective view of one of the shaft boxes.

Fig. 8 is a perspective view of one of the chain bearing strips.

In general my invention consists of a wheeled vehicle whereon are mounted suitable plows for removing the beets from the ground, means to clutch said beets by the tops thereof and carry the same to suitable knives whereat the beets and the beet tops are severed, elevators to receive the beets and the beet tops and carry the same to separate bins, and means to adjust the various parts suitably for the work.

The vehicle consists of a frame 9, to the front end of which is pivotally attached the front axle 10. Means to propel the vehicle are to be attached to said axle 10, and the ordinary horse pole and equalizers are most suitable.

Pivotally attached to the front member of the frame 9 are a pair of bent arms 11, each of which arms carries at its lower end a suitable plow 12, said plows adapted to work upon opposite sides of a row of beets to remove the same from the ground.

To adjust the relation of said plows 12 to the ground I provide a lever 13 with a latch thereon suitable for engaging notches upon a quadrant 14, said lever having thereon an arm 15 connected by a link 16 to a cross pin 17 between the arms 11, as shown in Fig. 1.

To receive the beets as they are delivered from the plows 12, and to convey them to the topping knives I provide a pair of endless flexible members, preferably chains, 18 operating over sprockets 19 and 20, as shown in Fig. 2.

Said sprockets are journaled in an oscillating frame to be hereinafter described, and said chains 18 move in longitudinal slots in said frame, the adjacent portions of said chains immediately rearward of the plows 12 traveling in the same direction and at the same speed, and being backed up by the oscillating frame so that the space therebetween remains substantially constant, and just sufficient to retain the beet tops between the adjacent chain portions.

To sever the beets from their tops I provide topping knives, preferably circular, as shown at 21, one of said knives being secured upon each of the shafts of sprockets 20, and the peripheral edges of said knives being sharpened and practically in contact with each other.

In order to raise the beets from the plows, the slots in which the chains 18 operate are given an inclined position, and the upper portion thereof curved for the purpose of delivering the beets properly to the knives 21, as shown in Fig. 1.

The knives 21 are immediately below the sprockets 20, and to adjust the said knives vertically relatively to said sprockets for the purpose of topping the beets clean I provide that each of said knives may be raised or lowered upon the sprocket shafts 22 of sprockets 20, and secured in position thereon by set screws, as shown in Fig. 1.

To receive the severed beets and beet tops I provide respective elevators therefor, each elevator being pivotally upon the oscillating frame rearward of the knives 21, each of said elevators consisting of side members 23, supporting rods 24, sprockets or pulleys 25 with endless flexible members or belts thereon. The elevator adapted to receive beet tops is disposed immediately above that adapted to receive the severed beets, the former being provided with slats 27, or the like, suitable for retaining the beet tops upon their respective elevator members 26, and the latter being provided with buckets 28, or the like, suitable for receiving the beets and retaining them upon the elevator members 26.

Rearward of said elevators, and below the discharging ends thereof, I provide suitable respective bins or receptacles 29 to receive the material therefrom. In order that the contents of said bins may be dumped from time to time I provide therefor hinged bottoms 30, each connected by a lever 31 and reach rod 32 to one end of a lever 33, said lever 33 having thereon a catch adapted to engage suitable notches in a quadrant 34.

To drive the various mechanisms just described I provide a cross shaft 35 mounted upon frame members 9 and connected to one of the rear wheels 36 of the vehicle by means of a drive chain 37 and gears 38, as shown in Fig. 2.

Each of the sprocket shafts 22 is driven from the cross shaft 35 by means of bevel gears 39, and thus the chains 18 and the knives 21 are operated.

The shafts 40 mounted upon the rearward end of each elevator are each driven from cross shaft 35 by means of flexible members, preferably chains, 41 operating over suitable sprockets secured to shafts 35 and 40, as shown in Figs. 1 and 2.

The supporting rods 24 of the elevators are pivotally mounted upon the cross shaft 35. Thus the entire apparatus, including the chains 18, knives 21, and both elevators are mounted oscillatingly about shaft 35 by means of an oscillating frame illustrated in detail in Figs. 3 and 4.

This frame contains suitable bearings 41 to receive cross shaft 35, and also suitable bearings 42 and 43 to receive the sprocket shafts 22. Rearwardly disposed bearings 44 and 45 are provided respectively for the foot shafts 46 and 47 respective to the upper elevator for the beet tops and to the lower elevator for the beets.

The rearward end of the oscillating frame is rectangular in shape, and provided with an inclined bottom 48, the sides of the frame and said bottom forming a hopper or receptacle beneath the knives 21 into which the severed beets drop, and from which said severed beets are removed by the lower elevator and buckets 28, to be deposited in their respective bin 29.

A partition or shelf 49 is provided in the rearward end of the oscillating frame, disposed between the shafts 46 and immediately below the knives 21 for the purpose of receiving the severed beet tops, from which shelf said beet tops are removed by the upper elevator and slats 27, to be deposited in their respective bin 29.

The forward end of the oscillating frame consists of a pair of downwardly inclined arms 50, the forward ends of which are forked to receive sprockets 19, and each of said forked ends is provided with transverse slots or rectangular orifices 51 in which are slidably mounted suitable boxes 53 as bearings for the sprocket shafts 52 of sprockets 19. Each of said boxes 53 is provided with a guide 54 adapted to slide transversely within its respective orifice 51, and collars 55 are provided upon each shaft 52 to secure said boxes in place.

Springs 56 connect adjacent pairs of said boxes 53, as shown in Figs. 2 and 6, the purpose of said springs being to secure a proper relative close adjustment of the chains 18, and to provide that said chains may separate should any excessive bulk be deposited therebetween.

The chains 18 are guided in their movement by slots 57 in the arms 50, and to provide a yieldable relationship between the chains 18 as they move rearwardly from the sprockets 19 I provide in the adjacent slots 57 wearing strips 58 each adapted to contact with its respective chain 18, said wearing strips being forced towards each other by springs 59 in pockets 60 upon arms 50. To adjust the tension of said springs I provide in each of said pockets a piston 61 and a set screw 62 contacting therewith, as shown in Fig. 5, whereby the tension in the respective spring may be adjusted to suit.

It is obvious that the entire moving mechanism is mounted upon and within the oscillating frame pivotally mounted upon the cross shaft 35, and that the weights forward and rearward of said cross shaft approximately balance.

To adjust the oscillating frame so that the sprockets 19 are in proper relation to the plows 12 for the chains 18 to receive the beets, I provide a hand lever 63 with a suitable latch for engaging notches in a quadrant 64, an arm 65 of said lever being connected by a link 66 to a cross pin 67 mounted upon arms 50, whereby the forward end of the oscillating frame with the sprockets 19 and chains 18 thereon may be raised or lowered to conform to the position of the plows 12.

My invention may be made of any size and constructed of any materials deemed convenient and suitable for a device of this character, and while I have illustrated and described a form of construction and arrangement of parts found desirable in materializing my invention, I wish to include in this application for Letters Patent all mechanical equivalents or substitutes that may fairly be considered to come within the scope and purview of my invention as defined in the appended claims.

Having disclosed my invention so that others may be enabled to construct and to use the same, what I claim as new, and desire to secure by Letters Patent is:

In a harvesting machine, an oscillatable frame; two pairs of sprockets mounted within said frame; a flexible member operating upon each pair of said sprockets and through grooves in said frame; yieldable means for holding adjacent sprockets of each pair in close relationship; and yieldable guides within certain of said grooves for the purpose of preserving yieldable relationship between adjacent portions of said flexible members.

In witness whereof I claim the foregoing as my own, I hereunto affix my signature in the presence of two subscribing witnesses, at Portland, county of Multnomah, State of Oregon, this 21st day of Sept., 1918.

CHARLES W. WOODSON.

Witnesses:
C. F. BLAKE,
L. J. ROBINSON.